United States Patent
Mitake (10) Patent No.: US 12,450,944 B2
(45) Date of Patent: Oct. 21, 2025

(54) IMPERSONATION DETECTION SYSTEM AND IMPERSONATION DETECTION PROGRAM

(71) Applicant: Variety M-1 Inc., Kanagawa (JP)

(72) Inventor: Toshiaki Mitake, Kanagawa (JP)

(73) Assignee: VARIETY M-1 INC., Kanagawa (JP)

( * ) Notice: Subject to any disclaimer, the term of this patent is extended or adjusted under 35 U.S.C. 154(b) by 0 days.

(21) Appl. No.: 18/868,168

(22) PCT Filed: Feb. 15, 2024

(86) PCT No.: PCT/JP2024/005375
§ 371 (c)(1),
(2) Date: Nov. 22, 2024

(87) PCT Pub. No.: WO2024/190260
PCT Pub. Date: Sep. 19, 2024

(65) Prior Publication Data
US 2025/0118104 A1    Apr. 10, 2025

(30) Foreign Application Priority Data
Mar. 14, 2023    (JP) ................. 2023-040020

(51) Int. Cl.
*G06V 40/16*    (2022.01)
*G06F 21/32*    (2013.01)
*G06V 40/40*    (2022.01)

(52) U.S. Cl.
CPC ............ *G06V 40/172* (2022.01); *G06F 21/32* (2013.01); *G06V 40/171* (2022.01); *G06V 40/40* (2022.01)

(58) Field of Classification Search
CPC .... G06V 40/172; G06V 40/171; G06V 40/40; G06F 21/32
See application file for complete search history.

(56) References Cited

U.S. PATENT DOCUMENTS 8,457,367 B1 *    6/2013    Sipe ........................ G06F 21/32
382/118
2011/0254942 A1    10/2011    Suzuki
(Continued)

FOREIGN PATENT DOCUMENTS

CN    110688878 A    1/2020
CN    115512409 A    12/2022
(Continued)

OTHER PUBLICATIONS

International Search Report in PCT Application No. PCT/JP2024/005375 mailed Mar. 19, 2024, 5pp.
(Continued)

*Primary Examiner* — Wesley J Tucker
(74) *Attorney, Agent, or Firm* — HAUPTMAN HAM, LLP (57) ABSTRACT

An impersonation detection system includes capturing means that captures a plurality of frame images of an authentication target person at different angles, feature detection means that detects an aspect ratio which is a ratio of a longitudinal length to a lateral length of a face of the authentication target person from each of the plurality of frame images captured by the capturing means, and impersonation detection means that detects impersonation of a person by a plane surface object based on the aspect ratio of the face of the authentication target person captured at different angles.

8 Claims, 6 Drawing Sheets

(56) References Cited

U.S. PATENT DOCUMENTS

| | | | |
|---|---|---|---|
| 2017/0228586 A1* | 8/2017 | Morishita | G06V 40/161 |
| 2018/0349682 A1* | 12/2018 | Wong | G06V 40/172 |
| 2020/0184059 A1* | 6/2020 | Wu | G06F 21/32 |
| 2020/0349372 A1* | 11/2020 | Lee | G06V 40/169 |
| 2021/0295016 A1 | 9/2021 | Yan | |
| 2021/0326423 A1* | 10/2021 | Cinelli | G06V 40/172 |
| 2022/0019771 A1* | 1/2022 | Matsunami | G06V 40/20 |
| 2022/0044821 A1* | 2/2022 | Eichler | G16H 50/20 |
| 2022/0366158 A1 | 11/2022 | Mitake | |
| 2023/0245271 A1* | 8/2023 | Song | G06V 40/171 |
| | | | 382/284 |
| 2023/0419737 A1* | 12/2023 | Bruveris | G06V 20/64 |
| 2024/0021020 A1* | 1/2024 | Shekhar | G06V 10/82 |
| 2024/0143951 A1 | 5/2024 | Mitake | |
| 2025/0037509 A1* | 1/2025 | Shumsky | G06T 7/80 |

FOREIGN PATENT DOCUMENTS

| | | |
|---|---|---|
| EP | 3958208 A1 | 2/2022 |
| JP | 2014010686 A | 1/2014 |
| JP | 2021-168047 A | 10/2021 |
| WO | 2010050206 A1 | 5/2010 |

OTHER PUBLICATIONS

Office Action in JP Application No. 2023-040020 mailed Jan. 9, 2024, 7pp.

Office Action in CN Application No. 2024480002650.1, mailed Jun. 21, 2025, 19pp.

\* cited by examiner

IMPERSONATION DETECTION SYSTEM AND IMPERSONATION DETECTION PROGRAM

RELATED APPLICATIONS

The present application is a National Phase of International Application Number PCT/JP2024/005375 filed Feb. 15, 2024, which claims the benefit of priority from Japanese Patent Application No. 2023-040020, filed on Mar. 14, 2023.

TECHNICAL FIELD

The present invention relates to an impersonation detection system and an impersonation detection program capable of preventing impersonation using a plane surface object such as a photograph. The detection program according to the present invention is software that can be executed on a computer, and can be stored in a computer-readable storage medium such as a CD-ROM, a DVD, a USB memory, an HDD, a Solid State Drive (SSD), and the like.

BACKGROUND ART

In the related art, a technique for storing authentication information (for example, human eyes, a mouth, or the like) in a form including an information code and authenticating a person using the authentication information included in the information code and the authentication information obtained by capturing a target person is known (for example, Patent Literature 1). In addition, a technique for preventing impersonation using a photograph or the like in a case of authenticating a person is known (for example, Patent Literature 2).

Here, an information code such as a QR code (registered trademark) has a limited storage capacity, and it is difficult to include information such as the entire face as the authentication information. Therefore, as described in Patent Literature 1, a method of performing authentication on a person is proposed to include feature points such as eyes and a mouth, which are parts of a face, in the information code and to compare the feature points. However, in Patent Literature 1, in a case of capturing a face of a target person, there is a case where a malicious third party causes a camera to capture a photograph or the like in which the face of the target person is captured, thereby impersonating the target person and being authenticated.

Here, in Patent Literature 2, in order to perform authentication of a person by comparing feature points and prevent impersonation using a photograph, impersonation of whether a photograph or a real object is determined by comparing images captured at different angles. Specifically, in Patent Literature 2, an inspection target object is captured at different angles to obtain a first image and a second image, and coordinates of a second feature point detected from the second image are converted into a planar projection on the first image. In a case where a difference between the coordinates obtained through the conversion and coordinates of a first feature point detected from the first image is equal to or less than a certain value, it is determined that an impersonation is attempted.

CITATION LIST

Patent Literatures

Patent Literature 1: Japanese Patent Application Laid-Open No. 2021-168047

Patent Literature 2: International Publication No. 2010/050206

SUMMARY

Technical Problem

As described above, Patent Literature 2 discloses a configuration in which whether or not the inspection target object is a three-dimensional object is determined by comparing images obtained by capturing the inspection target object at different angles. However, in recent years, with the increase in security awareness, there is a demand for an impersonation detection system and an impersonation detection program with higher accuracy in impersonation determination.

Solution to Problem

In order to solve such problems, the inventors conducted intensive studies and found that impersonation determination with higher accuracy can be obtained by verifying whether or not a target object is a plane surface object. Specifically, the inventor finds, by determining whether the authentication target person is a plane surface object such as a photograph or a real person based on a ratio (aspect ratio) of a longitudinal length to a lateral length of the face in images capturing a face of an authentication target person, it is possible to reduce a data capacity used for detecting impersonation and to detect impersonation using a plane surface object such as a photograph with high accuracy. The present invention is created by these findings.

[1] The present invention provides an impersonation detection system according to (1) to (6) below.

(1) An impersonation detection system, which detects whether an authentication target person is a real person or a person captured in a plane surface object, including: capturing means for capturing a plurality of frames of a face of the authentication target person at different angles; feature detection means for detecting an aspect ratio which is a ratio of a longitudinal length to a lateral length of the face of the authentication target person from each of a plurality of frame images captured by the capturing means; and impersonation detection means for detecting impersonation of a person using the plane surface object based on the aspect ratio of the face of the authentication target person captured at the different angles.

(2) The impersonation detection system according to (1), in which the impersonation detection means calculates, as a plane similarity degree, a change rate or a change amount of the aspect ratio of the face of the authentication target person with respect to a reference aspect ratio for each of the frame images, and detects the impersonation based on a plurality of the calculated plane similarity degrees.

(3) The impersonation detection system according to (2), in which the impersonation detection means acquires, as the reference aspect ratio, an aspect ratio of the face of the person himself/herself registered in advance, or an aspect ratio of the face of the authentication target person in a frame image captured first among the plurality of frame images.

(4) The impersonation detection system according to (2) or (3), in which the impersonation detection means extracts at least three feature points positioned apart in a width direction of the face among a plurality of feature points in each of the frame images, calculates a ratio of distances between the feature points on a right side and a left side of the face at the extracted feature points as a three-dimensional similarity degree, and detects the impersonation based on a plurality of the plane similarity degrees and a plurality of the three-dimensional similarity degrees calculated for each of the frame images.

(5) The impersonation detection system according to (4), in which the impersonation detection means performs a process of counting up a plane score in a case where the plane similarity degree is equal to or greater than a predetermined value and counting up a three-dimensional score in a case where the three-dimensional similarity degree is equal to or greater than a predetermined value for each of the frame images, detects that impersonation is present in a case where the plane score is equal to or greater than a predetermined difference D with respect to the three-dimensional score, and detects that impersonation is not present in a case where the three-dimensional score is equal to or greater than the difference D with respect to the plane score.

(6) The impersonation detection system according to any one of (1) to (5), in which the feature detection means detects positions of feature points of the face of the target person for each of the frame images captured at the different angles, and the impersonation detection means further performs a process of calculating a difference in the positions of the feature points from other frame images continuously captured, for each of the frame images, and determining that impersonation using both the plane surface object and a three-dimensional object is present in a case where the difference is equal to or greater than a threshold value TL.

In addition, the present invention provides an impersonation detection program according to (7) below.

(7) An impersonation detection program, which detects whether an authentication target person is a real person or a person captured in a plane surface object, causing a computer to execute an acquisition function of acquiring a plurality of frame images obtained by capturing the authentication target person at different angles; a feature detection function of detecting an aspect ratio which is a ratio of a longitudinal length to a lateral length of a face of the authentication target person from each of the plurality of frame images; and an impersonation detection function of detecting impersonation of a person using the plane surface object based on the aspect ratio of the face of the authentication target person captured at the different angles.

[2] The present invention according to another aspect can also provide an impersonation detection system according to (8) to (14) below.

(8) An impersonation detection system, which detects whether an authentication target person is a real person or a person captured in a plane surface object, including capturing means for capturing a plurality of frames of a face of the authentication target person at different angles; feature detection means for detecting an aspect ratio which is a ratio of a longitudinal length to a lateral length of the face of the authentication target person from each of a plurality of frame images captured by the capturing means; and impersonation detection means for detecting impersonation of a person using the plane surface object based on the aspect ratio of the face of the authentication target person captured at the different angles.

(9) The impersonation detection system according to (8), in which the impersonation detection means calculates, as a plane similarity degree, a change rate or a change amount of the aspect ratio of the face of the authentication target person with respect to a reference aspect ratio for each of the frame images, and detects the impersonation based on a plurality of the calculated plane similarity degrees.

(10) The impersonation detection system according to (9), in which the impersonation detection means acquires, as the reference aspect ratio, an aspect ratio of the face of the person himself/herself registered in advance, or an aspect ratio of the face of the authentication target person in a frame image captured first among the plurality of frame images.

(11) The impersonation detection system according to (8), in which the impersonation detection means extracts at least three feature points positioned apart in a width direction of the face among a plurality of feature points in each of the frame images, calculates a ratio of distances between the feature points on a right side and a left side of the face at the extracted feature points as a three-dimensional similarity degree, and detects the impersonation based on a plurality of the three-dimensional similarity degrees calculated for each of the frame images.

(12) The impersonation detection system according to (9) or (10), in which the impersonation detection means extracts at least three feature points positioned apart in a width direction of the face among a plurality of feature points in each of the frame images, calculates a ratio of distances between the feature points on a right side and a left side of the face at the extracted feature points as a three-dimensional similarity degree, and detects the impersonation based on a plurality of the plane similarity degrees and a plurality of the three-dimensional similarity degrees calculated for each of the frame images.

(13) The impersonation detection system according to (12), in which the impersonation detection means performs a process of counting up a plane score in a case where the plane similarity degree is equal to or greater than a predetermined value and counting up a three-dimensional score in a case where the three-dimensional similarity degree is equal to or greater than a predetermined value for each of the frame images, detects that impersonation is present in a case where the plane score is equal to or greater than a predetermined difference D with respect to the three-dimensional score, and detects that impersonation is not present in a case where the three-dimensional score is equal to or greater than the difference D with respect to the plane score.

(14) The impersonation detection system according to any one of (8) to (13), in which the feature detection means detects positions of feature points of the face of the target person for each of the frame images captured at the different angles, and the impersonation detection means further performs a process of calculating a difference in the positions of the feature points from other frame images continuously captured, for each of the frame images, and determining that impersonation using both the plane surface object and a three-dimensional object is present in a case where the difference is equal to or greater than a threshold value TL.

In addition, according to another aspect of the present invention, there is provided a recording medium for a following (15) to (21) of the impersonation detection program.

(15) A recording medium of an impersonation detection program, which detects whether an authentication target person is a real person or a person captured in a plane surface object, in which the program includes an acquisition function of acquiring a plurality of frame images obtained by capturing the authentication target person at different angles; a feature detection function of detecting an aspect ratio which is a ratio of a longitudinal length to a lateral length of a face of the authentication target person from each of the plurality of frame images; and an impersonation detection function of detecting impersonation of a person using the plane surface object based on the aspect ratio of the face of the authentication target person captured at the different angles.

(16) The recording medium according to (15), in which the impersonation detection function calculates, for each frame image, a change rate or a change amount in an aspect ratio of the face of the authentication target person with respect to a reference aspect ratio as a plane similarity degree, and detects the impersonation based on a plurality of the calculated plane similarity degrees.

(17) The recording medium according to (16), in which the impersonation detection function acquires, as the reference aspect ratio, an aspect ratio of the face of the person himself/herself registered in advance, or an aspect ratio of the face of the authentication target person in a frame image captured first among the plurality of frame images.

(18) The recording medium according to (15), in which the impersonation detection function extracts at least three feature points positioned apart in a width direction of the face among a plurality of feature points in each of the frame images, calculates a ratio of distances between the feature points on a right side and a left side of the face at the extracted feature points as a three-dimensional similarity degree, and detects the impersonation based on a plurality of the three-dimensional similarity degrees calculated for each of the frame images.

(19) The recording medium according to (16) or (17), in which the impersonation detection function extracts at least three feature points positioned apart in a width direction of the face among a plurality of feature points in each of the frame images, calculates a ratio of distances between the feature points on a right side and a left side of the face at the extracted feature points as a three-dimensional similarity degree, and detects the impersonation based on a plurality of the plane similarity degrees and a plurality of the three-dimensional similarity degrees calculated for each of the frame images.

(20) The recording medium according to (19), in which the impersonation detection function performs process of counting up a plane score in a case where the plane similarity degree is equal to or greater than a predetermined value and counting up a three-dimensional score in a case where the three-dimensional similarity degree is equal to or greater than a predetermined value for each frame image, detects the impersonation in a case where the plane score is equal to or greater than a predetermined difference D with respect to the three-dimensional score, and detects no impersonation in a case where the three-dimensional score is equal to or greater than the plane score with respect to the difference D.

(21) The recording medium according to any one of (15) to (20), in which the feature point detection function detects positions of feature points of the face of the target person for each of the frame images captured at the different angles, and the impersonation detection function further performs a process of calculating a difference in the positions of the feature points from other frame images continuously captured, for each of the frame images, and determining that impersonation using both the plane surface object and a three-dimensional object is present in a case where the difference is equal to or greater than a threshold value TL.

Advantageous Effects of Invention

According to the present invention, it is possible to detect impersonation using a plane surface object such as a photograph with high accuracy.

DESCRIPTION OF EMBODIMENTS

Figure 1:
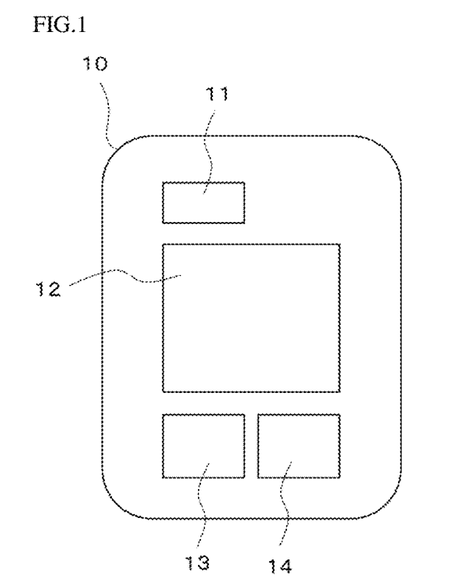
FIG. 1 is a configuration diagram of an impersonation detection system according to the present embodiment.

Embodiments of an impersonation detection system according to the present invention will be described with reference to the accompanying drawings. FIG. 1 is a block diagram showing a configuration of an impersonation detection system 1. As shown in FIG. 1, the impersonation detection system 1 according to the present embodiment can be configured with only an information processing apparatus 10. In addition, although not shown in the drawing, a configuration can also be adopted in which a server that can communicate with the information processing apparatus 10 is provided, and some functions of the information processing apparatus 10 are executed by the server. Hereinafter, a scene in which a target person who is a target of authentication (hereinafter, referred to as a target person) is authenticated by the single information processing apparatus 10 will be described as an example.

The information processing apparatus 10 is an apparatus such as a smartphone, a tablet, a laptop computer, a desktop computer, or the like, and has a camera 11, a display 12, a storage unit 13, and a computation unit 14 as shown in FIG. 1. The camera 11 captures a face image or the like of a target person. The display 12 displays authentication results and the like. The storage unit 13 stores an impersonation detection program according to the present embodiment, and stores an information code including registration information for authentication registered in advance. The computation unit 14 has an information registration function of registering registration information for authenticating the target person and an authentication function of authenticating the target person using the registration information by executing the program stored in the storage unit 13. The information processing apparatus 10 can download the impersonation detection program from the server, and can install and execute the downloaded program. Hereinafter, each function of the information processing apparatus 10 will be described.

Figure 2:
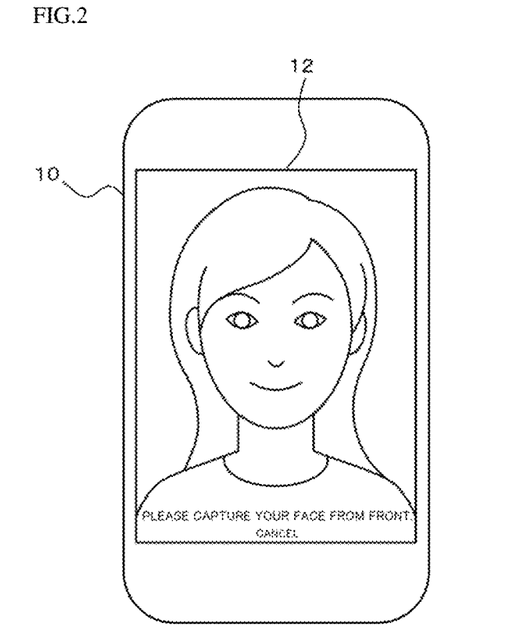
FIG. 2 is a diagram showing an example of a registration screen for registration information.

The information registration function of the information processing apparatus 10 registers the registration information for authentication. For example, as shown in FIG. 2, the information registration function displays an image for prompting the target person to capture the face on the screen of the display 12 to cause the target person to capture a face image, thereby acquiring the captured face image. Then, the information registration function extracts feature points such as the eyes, the nose, the mouth edge, and the face contour of the target person from the acquired face image of the target person. A feature point extraction method can be performed by a known method. Further, the information registration function calculates the position coordinates of the eyes, the nose, the mouth edge which are extracted and an aspect ratio which is a ratio of a longitudinal length of the face to a lateral length of the face, as the registration information. The longitudinal length of the face can be appropriately set, and can be, for example, a distance from the chin to the height of the space between the eyebrows, a distance from the height of the mouth edge to the height of the eyebrows, a distance from the chin to the height of the eyes, or the like. In addition, the lateral length of the face can also be appropriately set, and can be, for example, a distance from right temple to left temple. In addition, the information registration function can detect the face contour and can detect a ratio of a longest distance in a lateral direction (direction in which eyes are arranged) to a longest distance in a longitudinal direction (direction perpendicular to the direction in which eyes are arranged) in the detected face contour as an aspect ratio which is a ratio of a longitudinal length of the face to a lateral length of the face. In the present embodiment, a straight line passing through both eyes is set as a straight line in the lateral direction of the face, and a length of a line segment from the right temple to the left temple in the straight line in the lateral direction is calculated as the length of the lateral direction of the face. However, for example, a configuration may be adopted in which the left-right direction of the image is set as the lateral direction regardless of the inclination of the face, or a configuration may be adopted in which the horizontal direction is set as the lateral direction by obtaining the horizontal direction from a gyro sensor or the like. In addition, in the present embodiment, a straight line orthogonal to the set straight line in the lateral direction of the face can be set as the straight line in the longitudinal direction of the face, and the length of a line segment from the chin to the eyebrow, a line segment from the mouth edge to the eyebrow, or a line segment from the chin to the eyes among the straight lines in the longitudinal direction can be calculated as the length of the face in the longitudinal direction. In addition, since higher accuracy can be obtained as the length in the lateral direction and the length in the longitudinal direction of the face are longer, in a case where a line segment in the longitudinal direction or a line segment in the lateral direction is set, it is preferable to set a line segment to the end part of the face. Then, the information registration function generates an information code 2 including the registration information and stores the generated information code 2 in the storage unit 13.

Figure 3:
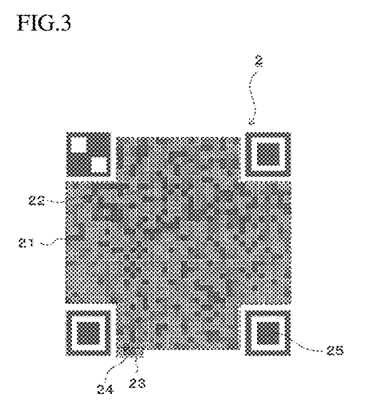
FIG. 3 is a diagram showing an example of an information code according to the present embodiment.

Here, FIG. 3 is a diagram showing an example of the information code 2 according to the present embodiment. As shown in FIG. 3, the information code 2 according to the present embodiment is a square two-dimensional code including an information code region 21 composed of two or more colored information cells 22 that are units for displaying information, a teacher code region 23 including a teacher cell 24 that is the same color as the information cell 22 and has the same number of colors as the information cell 22 in order to identify the color of the information cell 22, and a cut-out symbol 25.

The information code region 21 is composed of two or more colors of information cells 22 arranged in a lattice shape. The color of the information cell 22 is not particularly limited in a case of two or more colors, and may be, for example, two colors of white and black, or may be three or more colors other than white and black. In addition, in the present embodiment, the information code 2 includes a plurality of teacher cells 24 in the teacher code region 23 in order to increase the identification accuracy of the color of the information cell 22. The type of color of the teacher cell 24 and the type of color of the information cell 22 match each other, and the color of the information cell 22 can be identified with high accuracy by comparing the color of the teacher cell 24 with the color of the information cell 22. In particular, in the color QR code, the hues of the respective colors are closer to each other as the number of color types increases. Therefore, there is a case in which it is difficult to appropriately identify the color of the information cell 22 depending on the light environment such as illumination, the printing environment of the information code 2, the display environment for the display of the information code 2 or the like, the fading of the printed information code 2 due to the flow of time, or the like. Even in such a case, the information of the information cell 22 can be appropriately grasped by identifying the color of the information cell 22 with reference to the teacher cell 24. For example, in a case where the color information of the information cell 22 is purple and it is difficult to identify whether of being similar to red or blue, it can be determined that the color of the information cell 22 is red in a case of the color information closer to red than the color information of the teacher cell 24 of purple. The color information can be quantified as an RGB value or a CMY value.

The information code region 21 can record specific information consisting of text information and/or binary information having a certain capacity by changing a display pattern of the information cell 22 which is an information unit. The content of the specific information to be recorded in the information code region 21 is not particularly limited, but in the present embodiment, personal information including biometric authentication information for biometric authentication can be stored. The personal information can include information such as My number, passport number, an account number, a driver license number, a name, a social insurance number, a birthday, a birthplace, and a maiden name, in addition to the biometric authentication information. In addition, the biometric authentication information can include a face image, fingerprint information, iris information, a palm shape, a retina, a blood vessel, a voice, an ear shape, and the like. In the present embodiment, a configuration, which stores a face image as the biometric authentication information, particularly, an image of an eye, a nose, or a mouth edge as a feature point or information based on a feature point such as coordinates or an aspect ratio, will be described as an example.

In the information code 2 according to the present embodiment, the information code region 21 in which the specific information is recorded is composed of three or more colors of the information cells 22, so that the amount of information that can be recorded is large as compared to the information code composed of two colors of white and black. However, since the data capacity that can be stored in the information code 2 is small as compared to other recording media, in a case where the entire face image is recorded with a resolution that allows face authentication, there is a concern that the storage capacity may not be sufficient even in the information code region 21 composed of the four-color information cells 22. Therefore, in the information code 2 according to the present embodiment, the face image for face authentication can be recorded in the information code 2 by storing only a part of the face that is a feature point in the face authentication, such as the eyes, the nose, or the mouth edge of the user, instead of the entire face of the user as the face image for face authentication.

The authentication function of the information processing apparatus 10 authenticates the target person by determining whether or not the target person who attempts to receive the authentication using the information processing apparatus 10 is the person himself/herself who registered the registration information. In particular, in the present embodiment, in order to prevent impersonation using a plane surface object such as a photograph, the authentication function is characterized by determining whether the image of the target object captured by the camera 11 is a plane surface object such as a photograph or a three-dimensional object, and performing the authentication. An authentication method according to the present embodiment will be described later.

Figure 4:
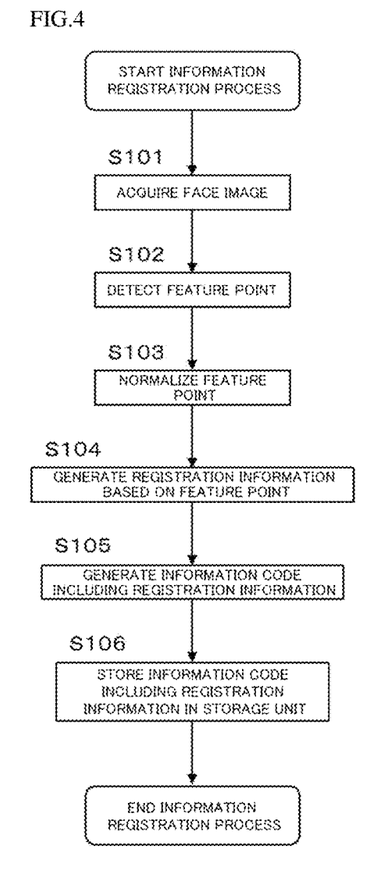
FIG. 4 is a flowchart showing an information registration process.

Next, an information registration process according to the present embodiment will be described. FIG. 4 is a flowchart showing the information registration process according to the present embodiment. The information registration process shown in FIG. 4 is executed by the information registration function of the information processing apparatus 10. Hereinafter, a person who performs the information registration process shown in FIG. 4 will be referred to as a registration target person.

In step S101, the face image of the registration target person captured by the camera 11 is acquired by the information registration function. For example, as shown in FIG. 2, the information registration function can acquire the face image of the registration target person by displaying a screen prompting to capture the face image of the registration target person on the display 12 and causing the registration target person to capture the face image.

In step S102, the feature points of the face image of the registration target person are detected by the information registration function. Specifically, the information registration function detects feature points such as the eyes, the nose, the mouth edge, and the face contour of the registration target person from the captured image acquired in step S101 by using a known method. In subsequent step S103, the normalization of the feature point detected in step S102 is performed by the information registration function. For example, the information registration function can be configured to change the position of the feature point such that the eyes, the nose, the mouth edge, and the like are positioned at predetermined reference positions by using a known method. In addition, in subsequent step S104, the registration information of the registration target person is generated based on the feature point normalized in step S103 by the information registration function. For example, the information registration function can generate the position coordinates of the normalized eyes, nose, and mouth edge as the registration information. In addition, the information registration function can generate, as the registration information, an aspect ratio which is a ratio of a lateral length to a longitudinal length of the face of the registration target person.

In step S105, the information code 2 for authentication is generated using the registration information generated in step S104 by the information registration function. For example, the information registration function can generate the information code 2 including the registration information used in step S104 by a known method. Then, in subsequent step S106, the information code 2 generated in step S105 is stored in the storage unit 13 by the information registration function.

Figure 5:
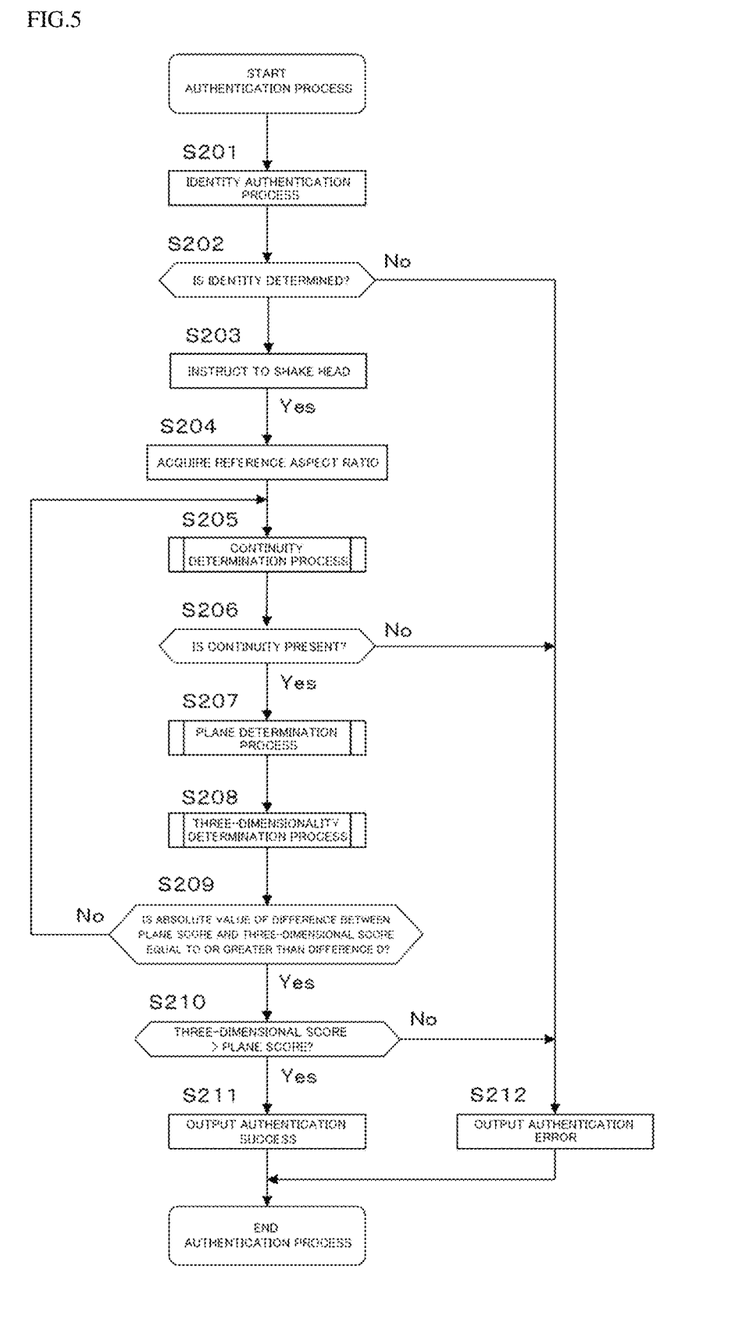
FIG. 5 is a flowchart showing an authentication process.

Next, an authentication process according to the present embodiment will be described. The authentication process according to the present embodiment is a process of determining whether or not a target person for performing the authentication process (hereinafter, referred to as an authentication target person) is a registration target person registered in the information registration process (hereinafter, referred to as a registrant) and performing the authentication. In particular, in the authentication process according to the present embodiment, even in a case where a malicious authentication target person impersonates the registrant by using a photograph in which the face of the registrant is captured, a mask, a photograph folded in accordance with the shape of the face, or the like, the authentication process aims to appropriately authenticate the authentication target person (appropriately detect the impersonation). FIG. 5 is a flowchart showing the authentication process according to the present embodiment. The authentication process shown in FIG. 5 is executed by the authentication function of the information processing apparatus 10.

In step S201, an identity authentication process for determining whether or not the registrant registered in the registration information in advance and the authentication target person to be authenticated are the same person is performed by the authentication function. The authentication function first acquires the registration information registered in the information registration process shown in FIG. 4. In the present embodiment, in the storage unit 13 of the information processing apparatus 10, the information of the feature points of the face of the registrant (positional information of the eyes, the nose, the mouth edge, the face contour, and the like, and the aspect ratio of the longitudinal length and the lateral length of the face) is stored as the registration information in the format of information code 2, and the authentication function can acquire the information code 2 including the registration information from the storage unit 13 and extract the registration information from the acquired information code 2. In addition, the authentication function acquires a face captured image of the authentication target person. For example, the authentication function displays a screen on which a comment such as "Please capture your face from the front" is superimposed on the display 12 to cause the camera 11 to capture the face of the authentication target person from the front, and thus it is possible to acquire the face captured image of the authentication target person, which is captured from the front. Then, the authentication function detects the feature point from the acquired face captured image of the authentication target person. Then, the authentication function compares the feature points of the face of the registrant registered in the registration information with the feature points of the face of the authentication target person to calculate the similarity degree. For example, the authentication function can calculate a distance between a nose and eyes, a distance between a nose and a mouth, a distance between left and right sides of a face contour, a distance between a forehead and a chin, and the like in the face image of the registrant and the face image of the authentication target person, and can calculate the comparison result as the similarity degree by comparing the distances.

In step S202, whether or not the authentication target person is the registrant himself/herself is determined by the authentication function based on the similarity degree calculated in step S201. For example, in a case where the distance between the nose and the eyes, the distance between the nose and the mouth, the distance between the left and right sides of the face contour, and/or the distance between the forehead and the chin of the registrant and the authentication target person calculated in step S201 are equal to or less than a predetermined value, the authentication function can authenticate that the authentication target person is the registrant himself/herself. Then, in the authentication function, in a case where it is determined that the authentication target person is the registrant himself/herself, the process proceeds to step S203. On the other hand, in a case where it is determined that the authentication target person is not the registrant himself/herself, the process proceeds to step S212 and an authentication error is displayed.

It should be noted that even in a case where the registrant and the authentication target person are the same person, a deviation may occur in the position of each feature point depending on the orientation of the face or the like. Therefore, in steps S201 and S202, the authentication function can also be configured to determine whether or not the registrant and the authentication target person are the same person as follows. That is, since the feature points tend to be distributed at a high density in parts such as eyes, a nose, a mouth edge, and a face contour, in a case where a range of a radius r1 in which a distribution density is equal to or greater than a predetermined value d in the distribution of the feature points of the registrant registered in the registration information and a range of a radius r2 in which a distribution density is equal to or greater than the predetermined value d in the distribution of the feature points of the authentication target person partially overlap each other, these feature points are identified as feature points that correspond to the same part (eyes, a nose, a mouth edge, a face contour, and the like), and, in a case where the feature points of the respective parts partially overlap each other, the person is recognized as the same person. In addition, the authentication function can be configured to determine whether or not the authentication target person is the same person by correcting the position of the feature points extracted from the face image of the authentication target person so as to match the orientation and the size of the face of the registrant acquired as the registration information by a known method.

Figure 6A:
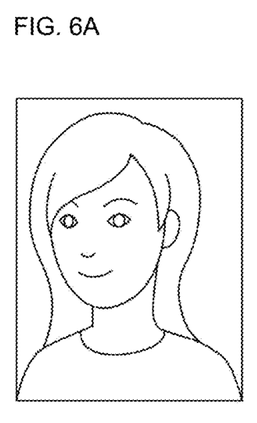
FIGS. 6A to 6C are diagrams showing an example of a method of acquiring a frame image.
Figure 6B:
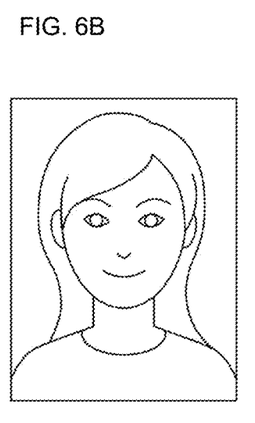
Figure 6C:
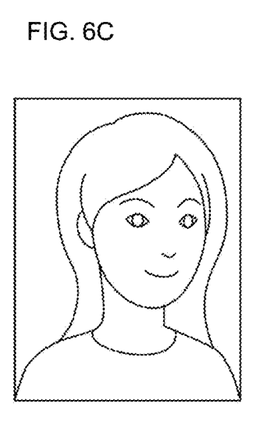

In step S203, in order to determine the impersonation using the plurality of face captured images of the authentication target person captured at different angles, an instruction to shake the head is given to the authentication target person by the authentication function. For example, the authentication function can cause the camera 11 to capture the face image of the authentication target person at different angles as shown in FIGS. 6A to 6C by displaying a screen on which a comment such as "please shake your head sideways" is superimposed on the display 12. In the following, each of the plurality of face captured images captured at different angles is referred to as a frame image.

In step S204, a reference aspect ratio is acquired by the authentication function. The reference aspect ratio is used in the plane determination process of step S207 described below. In the present embodiment, a ratio between a longitudinal length and a lateral length of a face of the authentication target person is calculated as an aspect ratio from a face image (frame image) of the authentication target person which is first captured after the authentication process shown in FIG. 5 is started, and the calculated aspect ratio is set as a reference aspect ratio. In addition, in the present embodiment, a configuration can be adopted in which the information on the feature points of the registrant (the positional information of the eyes, the nose, the mouth edge, and the face contour, and the aspect ratio of the longitudinal length and the lateral length of the face) is stored in the storage unit 13 as the registration information, and the aspect ratio of the face of the registrant stored as the registration information can be acquired as the reference aspect ratio. Further, a configuration can be adopted in which, among the plurality of frame images, an aspect ratio of the face of the authentication target person detected from the frame image captured at a predetermined timing, such as a timing at which the authentication target person faces the front, is acquired as the reference aspect ratio.

In steps S205 to S209, a continuity determination process, a plane determination process, and a three-dimensionality determination process, which will be described later, are performed for each frame image. In the following, the frame image to be processed will be described while being referred to as a target frame image.

Figure 7:
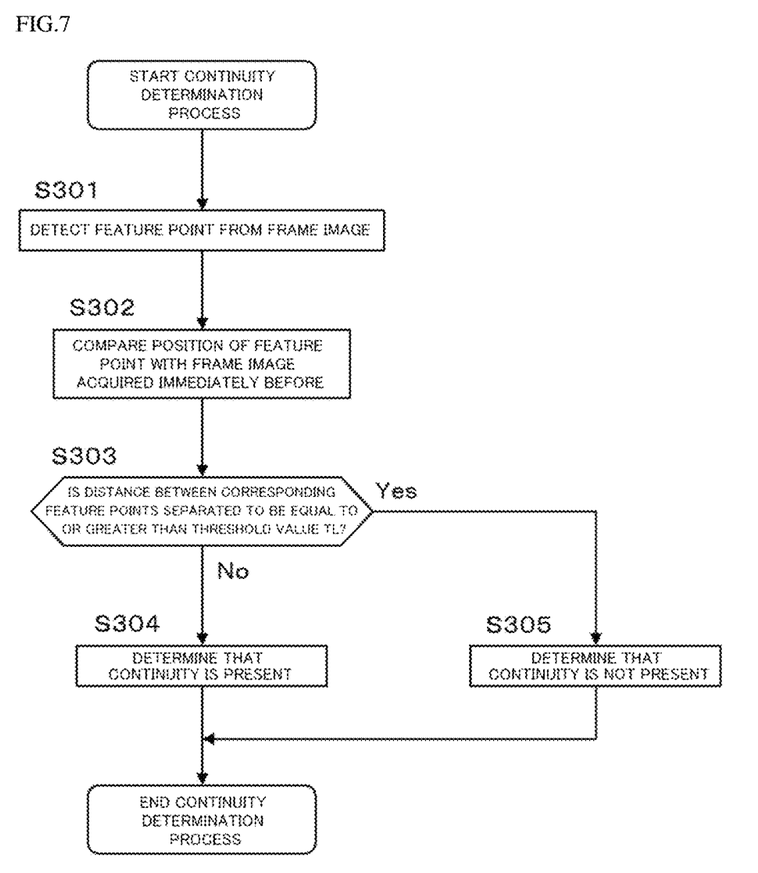
FIG. 7 is a flowchart showing a continuity determination process of step S205.

In step S205, the continuity determination process is performed by the authentication function. The continuity determination process is a process of determining whether or not the authentication target person performs impersonation by using both a real face (three-dimensional object) of the authentication target person and a plane surface object such as a photograph or a mask obtained by capturing the face of the registrant. That is, in a case where only plane surface object, such as a photograph or a mask, is used, it is assumed that a malicious authentication target person who knows that the authentication is not performed performs impersonation by capturing the plane surface objects such as the photograph or the mask and the real face of the authentication target person with the camera 11. In the continuity determination process, even in such a case, the purpose is to appropriately detect the impersonation of the authentication target person. Here, FIG. 7 is a flowchart showing the continuity determination process of step S205. Hereinafter, the continuity determination process of step S205 will be described with reference to FIG. 7.

First, in step S301, the feature point is detected from the frame image in which the face of the authentication target person is captured by the authentication function. For example, in the present embodiment, the authentication function extracts the feature point from the target frame image by using the information of the feature point included in the registration information. A method of extracting the feature point is not particularly limited, and a known method can be used.

In step S302, the position of the feature point detected from the target frame image is compared with the position of the feature point detected from the frame image acquired immediately before the target frame image (hereinafter, previous frame image) by the authentication function. Then, in subsequent step S303, by the authentication function, it is determined whether or not the distance between the corresponding feature points in the target frame image and the previous frame image compared in step S302 is equal to or greater than a threshold value TL. For example, the authentication function specifies, between the consecutive target frame images and the previous frame image, the feature point for the same element (for example, eyes, a nose, a mouth edge, a face contour, and the like) as the corresponding feature point for each element, and calculates the distance (difference in position) between the corresponding feature points for each element. Then, the authentication function determines whether or not a total value or an average value of the distance between the corresponding feature points is equal to or greater than the predetermined threshold value TL. Here, the threshold value TL is not particularly limited, but it is possible to set, as the threshold value TL, a distance at which it is possible to determine that the authentication target person performs impersonation using both the real face of the authentication target person and the photographic image of the registration target person, through a demonstration experiment or the like.

In step S303, in a case where the distance between the corresponding feature points between the consecutive frame images is less than the threshold value TL, the process proceeds to step S304. In step S304, by the authentication function, it is determined that the frame images continuously captured have continuity and that the impersonation is not performed using both the real face of the authentication target person and the photographic image of the registrant. In addition, in step S303, in a case where it is determined that the distance between the corresponding feature points is equal to or greater than the threshold value TL, the process proceeds to step S305. In step 305, by the authentication function, it is determined that the frame images continuously captured do not have continuity and that the impersonation is performed using both the real face of the authentication target person and the photographic image of the registrant. Then, returning to FIG. 5, the process proceeds to step S206.

In step S206, by the authentication function, it is determined whether or not it is determined that the continuity is present in the continuity determination process of step S205. In a case where it is determined that the continuity is present, the process proceeds to step S207. On the other hand, in a case where it is determined that the continuity is not present, the process proceeds to step S212. In step 212, by the authentication function, it is determined that the authentication function displays the authentication error notifying that the authentication target person and the registrant are not the same person. In the continuity determination process shown in FIG. 7, a configuration may be adopted in which the continuity is determined for all the frame images, a configuration may be adopted in which the continuity is determined only for the frame images for a predetermined time (for example, 1 second) after the authentication target person starts shaking his/her head, and a configuration may be adopted in which the continuity is measured for the frame images randomly extracted. In addition, a configuration may be adopted in which it is determined that the impersonation is present in a case where it is determined that the continuity is not present even in one frame image, or a configuration may be adopted in which it is determined that the impersonation is present in a case where it is determined that the continuity is not present in a predetermined number or more of frame images.

Figure 8:
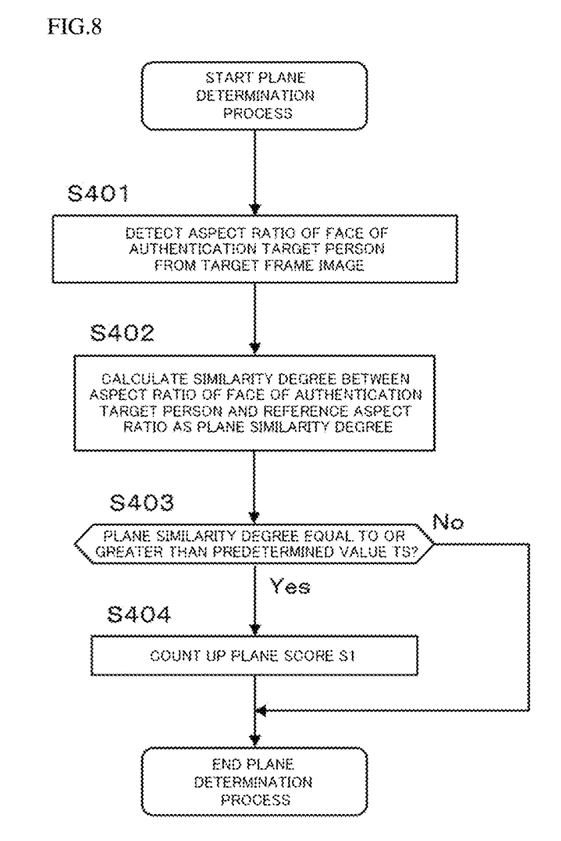
FIG. 8 is a flowchart showing a plane determination process of step S207.

In subsequent step S207, the plane determination process is performed by the authentication function. The plane determination process is a process of determining whether or not the authentication target person performs the impersonation using a plane surface object such as a photograph. Here, FIG. 8 is a flowchart showing the plane determination process of step S207. Hereinafter, the plane determination process of step S207 will be described with reference to FIG. 8.

First, in step S401, by the authentication function, for example, based on the face contour or the positions of the right and left temples and the positions of the chin and the eyebrows among the feature points of the target frame image, a ratio between a longitudinal length and a lateral length of the face of the authentication target person is calculated as an aspect ratio of the face of the authentication target person. In step S402, the plane similarity degree is calculated by the authentication function based on the aspect ratio R1 of the face of the authentication target person calculated in step S401 and the reference aspect ratio R2 acquired in step S204 shown in FIG. 5. Specifically, the authentication function calculates a change rate of the aspect ratio R1 of the face of the authentication target person with respect to the reference aspect ratio R2 as the plane similarity degree. For example, the authentication function can calculate an absolute value $|(R2-R1)/R2|$ of (reference aspect ratio R2-aspect ratio R1 of the face of the authentication target person)/reference aspect ratio R2 as a plane similarity degree.

Figure 9A:
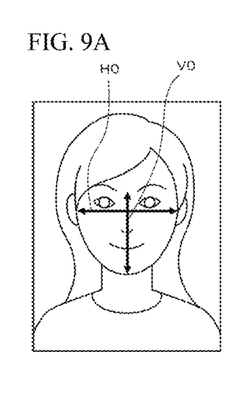
FIGS. 9A to 9C are diagrams for describing an aspect ratio in a case where an authentication target person is a real person and a case where the authentication target person is a photograph captured in a plane surface object.
Figure 9B:
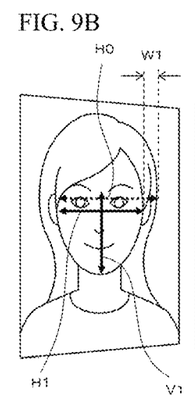
Figure 9C:
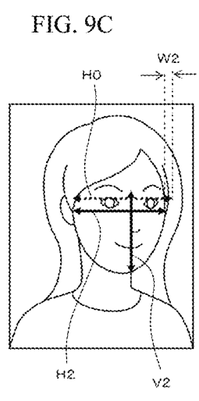

Here, FIGS. 9A to 9C are diagrams for describing an aspect ratio in a case where the authentication target person is a real person and a case where the authentication target person is a face image captured on a plane surface object such as a photograph, FIG. 9A is a frame image captured in a state where the real authentication target person faces the front, FIG. 9B is a frame image in which the photograph is captured in a state where the photograph is inclined in an oblique direction, and FIG. 9C is a frame image captured in a state where the real authentication target person faces an oblique direction. In addition, in FIGS. 9A to 9C, the longitudinal length and the lateral length of the face of each frame image are indicated by solid arrows. In addition, in FIGS. 9B and 9C, a lateral length H0 of the face in FIG. 9A is superimposed with a broken line. Further, in FIGS. 9B and 9C, difference between the lateral length of the face in FIG. 9A and the lateral lengths of the faces in FIGS. 9B and 9C are shown as W1 and W2.

In the example shown in FIGS. 9A to 9C, the distance the authentication target person and the photograph from the camera 11 is adjusted such that the longitudinal lengths V0 to V2 of the face are the same length. Here, as shown in FIG. 9B, in a case where the photograph is inclined in an oblique direction (in a case where the photograph is rotated in the yaw direction), the lateral length H1 of the face of the target person appearing in the photograph is shortened by an inclined angle of the photograph. On the other hand, as shown in FIG. 9C, in a case where the authentication target person is a real person, even in a case where the authentication target person faces an oblique direction, the lateral length H2 of the face of the authentication target person does not significantly change as compared with the lateral length H0 of the face in 9A in which the authentication target person faces the front. Therefore, as shown in FIG. 9C, in the real face of the authentication target person, the difference W2 between the lateral length H2 of the face in a case where the authentication target person faces an oblique direction and the length H0 of the face in a case where the authentication target person faces the front is small, but as shown in FIG. 9B, in the face image captured in the plane surface object, the difference W1 between the lateral length H1 of the face of the authentication target person in a case where the plane surface object faces an oblique direction and the length H0 of the face in a case where the real authentication target person faces the front is large. As a result, the aspect ratio of the face of the authentication target person in a case where the real face of the authentication target person faces the oblique direction is a value close to the reference aspect ratio, and the change rate from the reference aspect ratio is small, and thus the plane similarity degree tends to be small. On the other hand, as the plane surface object is inclined in the oblique direction, the aspect ratio of the face of the authentication target person in the oblique direction in a case where the authentication target person projected on the plane surface object is farther from the reference aspect ratio, the change rate from the reference aspect ratio is increased, and the plane similarity degree tends to be high.

Therefore, in a case where the authentication target person who tries to perform the authentication with the real face shakes the head to rotate the real face based on the instruction to shake the head, the number of frame images in which the plane similarity degree is equal to or greater than a predetermined value TS is reduced. On the other hand, in a case where the stranger who tries to perform the impersonation rotates the face image captured in the plane surface object as shaking the head based on the instruction to shake the head, the number of frame images in which the plane similarity degree is equal to or greater than the predetermined value TS is increased. Therefore, in the present embodiment, the number of frame images in which the plane similarity degree is equal to or greater than the predetermined value TS is counted as a plane score S1, and the impersonation using the plane surface object such as the photograph is detected based on the plane score S1.

That is, in step S403, by the authentication function, it is determined whether or not the plane similarity degree calculated in step S402 is equal to or greater than the predetermined value TS. In a case where the plane similarity degree is equal to or greater than the predetermined value TS, the process proceeds to step S404, and the plane score S1 is counted up by the authentication function. On the other hand, in a case where the plane similarity degree is less than the predetermined value TS, the process does not proceed to step S404, and the plane determination process shown in FIG. 8 is terminated. In the present embodiment, the plane similarity degree is calculated for each frame image, and the plane score S1 is counted up each time it is determined that the plane similarity degree is equal to or greater than the predetermined value TS in each frame image. Therefore, the plane score S1 is an index indicating a possibility that the face of the authentication target person is a face image captured in a plane surface object, and it can be determined that the higher the plane score S1, the higher the possibility of the face image obtained in such a way that the authentication target person is captured in the plane surface object.

Figure 10:
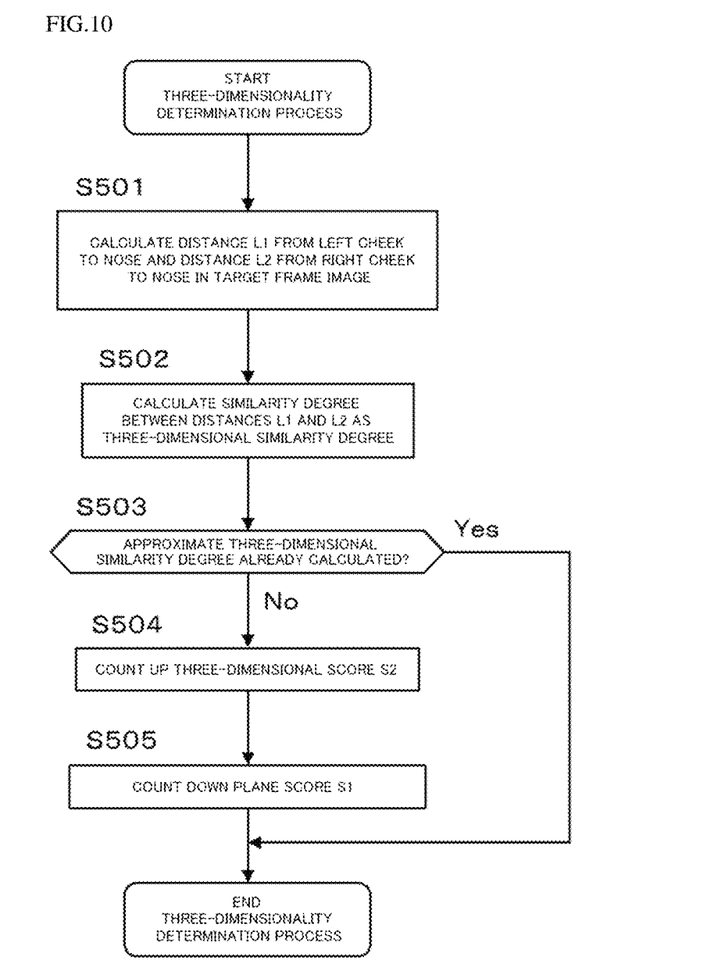
FIG. 10 is a flowchart showing a three-dimensionality determination process of step S208.

In step S208, the three-dimensionality determination process is performed by the authentication function. The three-dimensionality determination process is a process of determining whether or not the frame image is obtained by capturing a three-dimensional object such as a real person. FIG. 10 is a flowchart showing the three-dimensionality determination process of step S208. Hereinafter, the three-dimensionality determination process of step S208 will be described with reference to FIG. 10.

As shown in FIG. 10, first, in step S501, at least three feature points positioned apart in the width direction of the face among the plurality of feature points of the target frame image are extracted by the authentication function, and a distance (distance between the right side and the left side of the face) between the feature points is calculated. It is preferable that such feature points are as far apart as possible, and, for example, feature points corresponding to a nose and left and right cheeks, a nose and left and right temples, a nose and left and right contours, and a nose and left and right ears will be described as an example. For example, the authentication function may be configured to calculate a distance from a left cheek to a nose of the authentication target person as L1 and to calculate a distance from a right cheek to the nose as L2, may be configured to calculate a distance from a left temple to the nose of the authentication target person as L1 and to calculate a distance from a right temple to the nose as L2, or may be configured to calculate a distance from a left ear to the nose as L1 and to calculate a distance from a right ear to the nose as L2. In the present embodiment, the authentication function calculates a distance L1 from the left cheek to the nose of the authentication target person and a distance L2 from the right cheek to the nose.

In addition, in the present embodiment, it is preferable to calculate the distances L1 and L2 including the unevenness of the face. For example, the authentication function can be configured to determine whether or not the object is a three-dimensional object while taking the unevenness of the face into consideration by calculating the distance (height of the unevenness) in the unevenness direction of the face to be greater than the real distance. The height of the unevenness of the face can be calculated using a known method such as a configuration obtained from a change in feature points between consecutive frame images or a configuration in which the information processing apparatus 10 includes a built-in sensor such as LiDAR and also acquires height information with the LiDAR or the like may be provided.

In step S502, the distances L1 and L2 of the feature points calculated in step S501 are compared by the authentication function, and the comparison result is calculated as the three-dimensional similarity degree. In the present embodiment, the authentication function calculates a ratio (L1/L2) of the distance L1 from a left cheek to a nose to the distance L2 from a right cheek to the nose of the authentication target person as the three-dimensional similarity degree.

Here, in a case of a face image captured in a plane surface object such as a photograph, even in a case where the orientation of the plane surface object is changed, the distance L1 from the left cheek to the nose and the distance L2 from the right cheek to the nose of the authentication target person are not substantially changed. Therefore, the frequency at which the three-dimensional similarity degree is close to the three-dimensional similarity degree based on another frame image already calculated is increased. On the other hand, in a case of the real face person (three-dimensional object) of the authentication target person, in a case where the direction of the face is changed, the ratio (L1/L2) of the distance L1 from the left cheek of the authentication target person to the nose to the distance L2 from the right cheek of the authentication target person to the nose tends to change significantly. Therefore, the frequency at which the three-dimensional similarity degree is close to the three-dimensional similarity degree based on the already calculated another frame image is reduced. Therefore, in the present embodiment, the number of frame images in which the three-dimensional similarity degree does not approximate the above-described three-dimensional similarity degree is counted as a three-dimensional score S2, and it is determined whether or not the authentication target person is a real person (three-dimensional object) based on the three-dimensional score S2.

That is, in step S503, by the authentication function, it is determined whether or not the three-dimensional similarity degree calculated in step S502 is included in a certain range and approximates the three-dimensional similarity degree based on another frame image already calculated. In a case where the three-dimensional similarity degree is in a range exceeding the certain range from the three-dimensional similarity degree already calculated and does not approximate, the process proceeds to step S504, and the three-dimensional score S2 is counted up by the authentication function. Further, in subsequent step S504, the plane score S1 is counted down by the authentication function. On the other hand, in a case where the three-dimensional similarity degree is included in the certain range from the three-dimensional similarity degree already calculated and approximates, the three-dimensionality determination process shown in FIG. 10 is ended, and the process proceeds to step S209 shown in FIG. 5. In the present embodiment, the three-dimensional similarity degree is calculated for each frame image, and the three-dimensional score S2 is counted up whenever the three-dimensional similarity degree in each frame image does not approximate the three-dimensional similarity degree already calculated. Therefore, the three-dimensional score S2 is an index indicating the possibility that the authentication target person is a real person (three-dimensional object), and it can be said that the higher the three-dimensional score S2, the higher the possibility that the authentication target person is a real person. The size of the certain range that is a reference for determining whether or not the three-dimensional similarity degree is close to the above-mentioned three-dimensional similarity degree is not particularly limited and can be appropriately set in a demonstration experiment or the like.

In step S209, by the authentication function, it is determined whether the absolute value of the difference between the plane score S1 and the three-dimensional score S2 is equal to or greater than a predetermined difference D. Here, the difference D is preferable to set a threshold value where there is a large difference between the plane score S1 and the three-dimensional score S2 and the authentication target person is possible to be determined to be a real person or a plane surface object such as a photograph. The difference D can be set appropriately in a demonstration experiment or the like. In a case where the absolute value of the difference between the plane score S1 and the three-dimensional score S2 is less than the difference D, the determination is not sufficient and the plane score S1 and the three-dimensional score S2 are calculated based on another frame image, so that the process returns to step S205. Therefore, the processes of steps S205 to S208 are performed with another frame image acquired next to the target frame image as the target frame image. On the other hand, in a case where the absolute value of the difference between the plane score S1 and the three-dimensional score S2 is equal to or greater than the difference D, the process proceeds to step S210.

In step S210, by the authentication function, it is determined whether or not the three-dimensional score S2 is greater than the plane score S1. In a case where the three-dimensional score S2 is greater than the plane score S1 by a large difference (difference equal to or greater than the difference D), the process proceeds to step S211, it is determined that the authentication target is the real face of the authentication target person, and information indicating that the authentication is successful (authentication success) is output to the display 12. On the other hand, in a case where the plane score S1 is greater than the three-dimensional score S2 by a large difference (difference equal to or greater than the difference D), the process proceeds to step S212, and information indicating that the authentication is not possible (authentication error) is output to the display 12.

As described above, in the present embodiment, the ratio between the longitudinal length and the lateral length of the face of the authentication target person can be detected as the aspect ratio for each of the plurality of frame images captured by the camera 11, the change rate in the aspect ratio of the authentication target person with respect to the reference aspect ratio can be calculated as the plane similarity degree for each frame image, and whether or not the target person is a person captured in a plane surface object such as a photograph can be determined based on the plane similarity degree, so that it is possible to detect the impersonation using the plane surface object such as a photograph with high accuracy. In particular, in the present embodiment, by performing the plane surface object determination process of determining the plane surface object in combination with the three-dimensional object determination process of determining the three-dimensional object, it is possible to perform the impersonation detection with higher accuracy. That is, in the present embodiment, even in a case where the determination is made that the object is not a plane surface object in the plane surface object determination process, in the case the determination is made that the object is not a three-dimensional object in the three-dimensional object determination process, the authentication error is set, and thus it is possible to perform the authentication using the plane surface object such as a photograph with higher accuracy. In addition, in the present embodiment, the plane determination process is performed for each frame image, the number of frame images determined to be the plane surface object is scored as the plane score S1, and the number of frame images determined to be the three-dimensional object is scored as the three-dimensional score S2. Then, in a case where the difference between the plane score S1 and the three-dimensional score S2 is equal to or greater than the difference D, which is a large difference, determination is made as follows. That is, the determination is made as the plane surface object in a case where the plane score S1 is equal to or higher than difference D with respect to the three-dimensional score S2, and the determination is made as the three-dimensional object in a case where the three-dimensional score S2 is equal to or higher than difference D with respect to the plane score S1, so that it is possible to comprehensively determine whether or not the authentication target person is the plane surface object by using the plurality of frame images, and it is possible to improve the impersonation determination accuracy. In addition, in the present embodiment, by using the aspect ratio with a small storage capacity, it is possible to appropriately perform the impersonation determination even in a case where the storage capacity of the registration information is limited.

As described above, although the preferred embodiment of the present invention has been described, the technical scope of the present invention is not limited to the descriptions of the above embodiment. It is possible to make various changes and improvements to the above-described embodiment, and embodiments in which such changes and improvements have been made are also included in the technical scope of the present invention.

For example, in the above-described embodiment, the configuration in which the registration information is stored in the information code 2 is described as an example, but the present invention is not limited to the configuration, and a configuration can be adopted in which the registration information is stored as it is.

In addition, in the above-described embodiment, the configuration is described as an example in which the absolute value $|(R2-R1)/R2|$ of the change rate of the aspect ratio R1 of the face of the authentication target person with respect to the reference aspect ratio R2 is calculated as the plane similarity degree, but the present invention is not limited to the configuration. For example, a configuration can be adopted in which the absolute value $|R1-R2|$ of the change amount (difference) between the aspect ratio R1 of the face of the authentication target person and the reference aspect ratio R2 is calculated as the plane similarity degree. In this case, a configuration can be adopted in which the plane score S1 is counted up in a case where the plane similarity degree is equal to or greater than a predetermined value TS' and the plane score S1 is not counted up in a case where the plane similarity degree is less than the predetermined value TS'.

Further, in the above-described embodiment, the configuration is described as an example in which the ratio (L1/L2) of the distance L1 from the left cheek to the nose to the distance L2 from the right cheek to the nose of the authentication target person is calculated as the three-dimensional similarity degree, but the present invention is not limited to the configuration. For example, a configuration can be adopted in which a difference (L1−L2) between the distance L1 from the left cheek to the nose and the distance L2 from the right cheek to the nose of the authentication target person is calculated as the three-dimensional similarity degree. In this case as well, a configuration can be adopted in which the three-dimensional score S2 is counted up in a case where the three-dimensional similarity degree approximates the three-dimensional similarity degree that already appeared.

In addition, in the above-described embodiment, the configuration is described as an example in which, in the three-dimensionality determination process, the ratio (L1/L2) of the distance L1 from the left cheek to the nose and the distance L2 from the right cheek to the nose is calculated as the three-dimensional similarity degree. However, for example, in order to determine whether or not the authentication target person is a three-dimensional object by further considering the head shaking in the up-down direction, a configuration can be adopted in which the chin and the forehead are detected as feature points, and a ratio (L3/L4) is also calculated as the three-dimensional similarity degree using a distance L3 from the chin to the nose and a distance L4 from the nose to the forehead. In this case, a configuration can be adopted in which the plane surface object is determined by approximating the three-dimensional similarity degree represented by L1/L2 to the three-dimensional similarity degree represented by L1/L2 that is already calculated and/or approximating the three-dimensional similarity degree represented by L3/L4 to the three-dimensional similarity degree represented by L3/L4 that is already calculated.

The invention claimed is:

1. An impersonation detection system, which detects whether an authentication target person is a real person or a person captured in a plane surface object, comprising:

a camera configured to capture a plurality of frames of a face of the authentication target person at different angles; and a processor configured to
      detect an aspect ratio which is a ratio of a longitudinal length to a lateral length of the face of the authentication target person from each of a plurality of frame images captured by the camera;
      detect impersonation of a person using the plane surface object based on the aspect ratio of the face of the authentication target person captured at the different angles;
      calculate a change rate or a change amount of the aspect ratio of the face of the authentication target person with respect to a reference aspect ratio for each of the plurality of frame images as a plane similarity degree; and
      determine that the impersonation is present as the calculated plane similarity degrees increase, which is caused by an increasing divergence between the reference aspect ratio and the aspect ratio of the face of the authentication target person.

2. The impersonation detection system according to claim 1, wherein
   the processor is configured to
      extract at least three feature points positioned apart in a width direction of the face among a plurality of feature points in each of the plurality of frame images,
      calculate a ratio of distances between feature points on a right side and a left side of the face of the extracted at least three feature points as a three-dimensional similarity degree, and
      detect the impersonation based on a plurality of the three-dimensional similarity degrees calculated for each of the plurality of frame images.

3. The impersonation detection system according to claim 2, wherein
   the processor is configured to acquire, as the reference aspect ratio, an aspect ratio of the face of the person himself/herself registered in advance, or an aspect ratio of the face of the authentication target person in a frame image captured first among the plurality of frame images.

4. The impersonation detection system according to claim 2, wherein
   the processor is configured to
      perform a process of counting up a plane score in a case where the plane similarity degree is equal to or greater than a predetermined value and counting up a three-dimensional score in a case where the three-dimensional similarity degree is equal to or greater than a predetermined value for each of the plurality of frame images,
      detect that the impersonation is present in a case where the plane score is equal to or greater than a predetermined difference with respect to the three-dimensional score, and
      detect that the impersonation is not present in a case where the three-dimensional score is equal to or greater than the predetermined difference with respect to the plane score.

5. The impersonation detection system according to claim 2, wherein
   the processor is configured to detect positions of the plurality of feature points of the face of the authentication target person for each of the plurality of frame images captured at the different angles, and further perform a process of calculating a difference in the positions of the plurality of feature points from other frame images continuously captured, for each of the plurality of frame images, and determining that the impersonation using both the plane surface object and a three-dimensional object is present in a case where the difference is equal to or greater than a threshold value.

6. A non-transitory computer readable storage medium storing an impersonation detection program, the impersonation detection program detecting whether an authentication target person is a real person or a person captured in a plane surface object, causing a computer to execute:

acquiring a plurality of frame images obtained by capturing the authentication target person at different angles;

detecting an aspect ratio which is a ratio of a longitudinal length to a lateral length of a face of the authentication target person from each of the plurality of frame images;

detecting impersonation of a person using the plane surface object based on the aspect ratio of the face of the authentication target person captured at the different angles;

calculating, as a plane similarity degree, a change rate or a change amount of the aspect ratio of the face of the authentication target person with respect to a reference aspect ratio for each of the plurality of frame images; and determining that the impersonation is present as the calculated plane similarity degrees increase, which is caused by an increasing divergence between the reference aspect ratio and the aspect ratio of the face of the authentication target person; and the impersonation detection program causes the computer to further execute acquiring, as the reference aspect ratio, an aspect ratio of the face of the person himself/herself registered in advance, or an aspect ratio of the face of the authentication target person in a frame image captured first among the plurality of frame images.

7. The non-transitory computer readable storage medium storing the impersonation detection program according to claim 6, wherein the impersonation detection program causes the computer to further execute extracting at least three feature points positioned apart in a width direction of the face among a plurality of feature points in each of the plurality of frame images, calculating a ratio of distances between feature points on a right side and a left side of the face of the extracted at least three feature points as a three-dimensional similarity degree, and detecting the impersonation based on a plurality of the three-dimensional similarity degrees calculated for each of the plurality of frame images.

8. The non-transitory computer readable storage medium storing the impersonation detection program according to claim 7, wherein the impersonation detection program causes the computer to further execute detecting positions of the plurality of feature points of the face of the authentication target person for each of the plurality of frame images captured at the different angles, and further performing a process of calculating a difference in the positions of the plurality of feature points from other frame images continuously captured, for each of the plurality of frame images, and determining that the impersonation is present using both the plane surface object and a three-dimensional object in a case where the difference is equal to or greater than a threshold value.

\* \* \* \* \*